United States Patent [19]

Baur et al.

[11] Patent Number: 4,899,336

[45] Date of Patent: Feb. 6, 1990

[54] CENTRALLY CONTROLLED TELECOMMUNICATIONS EXCHANGE SYSTEM

[75] Inventors: Hans Baur, Starnberg; Hans Bittermann, Neuried, both of Fed. Rep. of Germany

[73] Assignee: Siemens Aktiengesellschaft, Berlin and Munich, Fed. Rep. of Germany

[21] Appl. No.: 201,497

[22] Filed: Jun. 1, 1988

[30] Foreign Application Priority Data

Jun. 11, 1987 [DE] Fed. Rep. of Germany ....... 3719517

[51] Int. Cl.$^4$ ...................... H04Q 3/545; H04Q 11/04
[52] U.S. Cl. ........................................ 370/63; 379/269
[58] Field of Search .................... 370/63, 58; 379/269, 379/113, 284

[56] References Cited

U.S. PATENT DOCUMENTS

| | | | |
|---|---|---|---|
| 4,484,323 | 11/1984 | Beuscher et al. | 370/58 |
| 4,499,461 | 2/1985 | Schneider | 340/825.03 |
| 4,564,725 | 1/1986 | Daisenberger | 379/138 |
| 4,658,098 | 4/1987 | Wegmann | 379/113 |
| 4,720,854 | 1/1988 | Sand | 379/269 |

FOREIGN PATENT DOCUMENTS

79/2960 6/1980 South Africa .

OTHER PUBLICATIONS

R. Lucky, "A Flexible Experimental Digital Switching Office," Report, Int'l Zurich Sem. on Dig. Comm.; Proceedings IEEE #78 (1978), pp. A4.1–A4.4.

*Primary Examiner*—Thomas W. Brown
*Attorney, Agent, or Firm*—David N. Caracappa

[57] ABSTRACT

In a telecommunications exchange system, consisting of a central section comprising a central switching network and a central coordination processor, and consisting of line trunk groups which are connected to the switching network via allocatable connection paths and which each comprise a subsidiary switching network and a subsidiary control unit, between the coordination processor on the one hand and each of the subsidiary control units on the other hand, a control channel exists via which the former at all times has access to each of the latter. With the start-up of an entire exchange system or only of individual line trunk groups, the coordination processor loads the subsidiary control units with items of switching orientated program information and with items of connection state data individually assigned to the individual subsidiary switching network terminals, which can consist of subscriber terminals and connection line terminals. On start-up the items of connection state data are transmitted individually in respect of each subsidiary switching network terminal, and in each case only when an incoming or outgoing connection establishment takes place via the respective subsidiary switching network terminal.

5 Claims, 1 Drawing Sheet

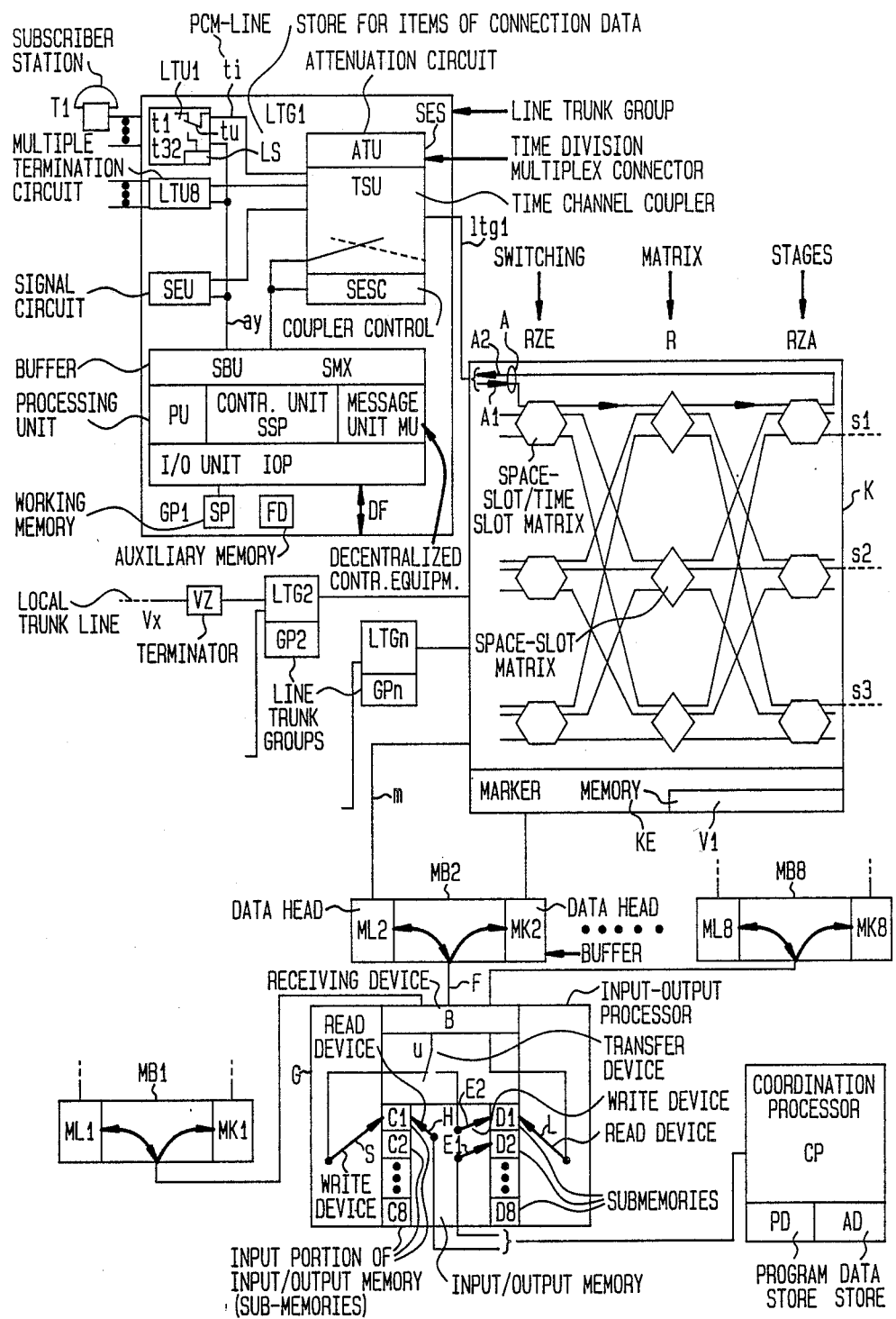

CENTRALLY CONTROLLED TELECOMMUNICATIONS EXCHANGE SYSTEM

BACKGROUND OF THE INVENTION

Field of the Invention

The invention relates to a centrally controlled telecommunications exchange system. Such a system includes a central section which comprises a central switching network and a central coordination processor, and with decentral line trunk groups, each of which comprises a subsidiary switching network, which is connected to the central switching network via connection paths, for example lines, channels or the like, which can be seized for the establishment of dialed connections, and a program-controlled subsidiary control unit, one of the functions of which is to switch through connections via said subsidiary switching network, and which are connected via connection-individual and/or subscriber-individual terminating circuits to subscriber lines and/or connection lines, and to corresponding channels which are combined in transmission systems, for example PCM systems and with a control channel which extends from the coordination processor to the subsidiary control units, in particular with control channels whose course is identical and which are provided individually in respect of each subsidiary control unit by which control channel, or control channels, in association with the switching-orientated start of operation of each line trunk group the coordination processor transmits to this line trunk group items of peripheral data which have been obtained from a central store assigned to this processor and which are stored semi-permanently by said line trunk group decentrally in a store assigned thereto and which in part consist of items of program information for its switching-orientated program control sequences and in part items of connection data which are individually assigned to the terminating circuits and to the connecting channels and which govern the switching operation in each individual case in respect of switching and control technology, such as for example subscriber number, subscriber connection state, allocation data, operating state data, operating data category, subscriber type data, connection line type and channel type data.

Description of the Related Art

Circuit arrangements of this kind have already been disclosed in European patent specification nos. 0 006 132 and 0 058 750. Thus these publications disclose a control path which is required to handle the switching processes of the overall information exchange between the central coordination processor on the one hand and each of the subsidiary control units on the other hand. However, this requires the same number of control channels as subsidiary control units are provided. Each subsidiary control unit is thus equipped with its own control channel. This plurality of control channels, individually assigned to the subsidiary control units, is made available via the central switching network; thus the control channels are switched through and kept permanently in the ready-for-operation state by the central switching network.

During the course of the switching operation via the respective line trunk group, the control channel individually assigned to the subsidiary control unit, serves mainly to exchange information items and control signals with the coordination processor. Here the respective subsidiary control unit has access via the control channel to the coordination processor; in the same way the coordination processor at all times has access to the subsidiary control unit. The aforementioned information items can consist, for example, of those information items which are continuously accumulated within a line trunk group by the respective subsidiary control unit either individually in respect of each subscriber or individually in respect of each connection line, and which are intended for processing in the central coordination processor. These information items can consist, for example, of the dialed information from dialing subscribers, and of other switching characteristics which arrive in association with connections which are to be established or have been established in the respective line trunk group and are likewise to be processed by the central coordination processor either individually in respect of each subscriber or individually in respect of each connection line, and therefore are to be transferred to the central coordination processor. The control signals for the switching operation can consist of information items which serve to switch through dialed connections within the respective line trunk group, and this via the subsidiary switching network assigned to said line trunk group. Connections of this type extend via the central switching network and normally via the subsidiary switching networks of two different line trunk groups.

Processors and control units of the type in question are known to be program controlled. Corresponding items of program information are stored in the central coordination processor and in the subsidiary control units. These items of program information indicate to the coordination processor and to the subsidiary control units the method and plan whereby they are to handle all the processing procedures. The principle of such program-controlled data processing systems is known in a large number of different variations.

The mode of operation of the central coordination processor on the one hand and of the decentral subsidiary control units on the other hand is predetermined not only by the respective items of program information but also by the overall construction of a corresponding telecommunications exchange system. This construction relates not only to the inner structure of the central switching network and its connections via the aforesaid connection paths to the subsidiary switching networks of the line trunk groups and the construction of the line trunk groups themselves, in particular their subsidiary switching networks, but also to the connection of each of the subsidiary switching networks of all the line trunk groups to subscriber and connection lines, and to the operating conditions thereof. Therefore each subsidiary control unit must store not only the respective items of program information but also the items of connection data already referred to in the introduction—which as stated—relate for example to the construction and connection of the line trunk group to subscriber and/or connection lines. These items of connection data indicate which line is connected and where, the type of the respective line, the conditions which apply to a connection establishment and the like, as already described in detail in the introduction.

The program information which is to be stored in each of the line trunk groups, and the items of connection data which indicate the connection of each of the line trunk groups to subscriber and connection lines, together form a comprehensive data set. Thus this data set is firstly stored centrally for the whole of a centrally controlled telecommunications exchange system of the described type, thus for all its line trunk groups. Thus at the start of operation of such a telecommunications exchange system, the central coordination processor contains all the program information required to carry out the switching operation, and all the connection data relating to each of the line trunk groups, not only for its own requirements but also for all the subsidiary control units.

Thus, at the start of operation of a telecommunications exchange system of the type outlined above, the appropriate program information together with the respective connection data set must be transmitted from the central coordination processor to each of the line trunk groups. In arrangements of the known type the control channels, individually assigned to the subsidiary control units, are used for this purpose.

Therefore in telephone exchange systems of the known type referred to above, in association with the above-described facts it is provided that for the current switching operation, the program information required to handle same is stored in or by each subsidiary control unit. In the same way, the items of connection data which are required to handle the switching operation and which indicate the construction and connection of each line trunk group to subscriber and connection lines must be individually transmitted from the central coordination processor to the subsidiary control units of each of the different line trunk groups and stored therein.

This transmission and storage of all the program information and of all the connection data necessitates, in telephone exchange systems of the described known type, a not inconsiderable time outlay. In such systems the switching operation cannot be started until all these transmission and storage procedures have been completed. As the program information is generally the same for the different line trunk groups, in the described cases it is transmitted simultaneously, in accordance with a known broadcast process, to all the subsidiary control units and stored therein, which permits a partial economy of a corresponding proportion of the respective transmission and storage time requirement. However, the items of connection data must be transmitted individually for each line trunk group, which necessitates an individual transmission and storage procedure for each of the line trunk groups, i.e. for each subsidiary control unit, and thus necessitates an unfavorably high time outlay. As a result of the start-up or re-start-up of a telephone exchange system of the known type this delays the start of the switching operation, thus the time at which establishment of dialed connections is commenced.

The transmission of all the program information and of all the connection data to each of the individual line trunk groups is expediently carried out in accordance with the regulations of a transmission procedure which is optimally adapted to and therefore provided for the current switching operation. For the current switching operation the respective data items (dialed information, switching characteristics, control signals and the like, see above) are exchanged in portions whose scope—and thus whose data format—is optimally adapted to the conditions of the current switching operation, where an appropriately-safeguarded transmission procedure is essential. These information items occur in small portions of comparable size. The use of this transmission procedure for the transmission of program information and connection data additionally increases the time requirement until the start of the switching operation in known systems of this kind.

The individual transmission of the items of connection data to each of the line trunk groups, in particular in accordance with the regulations provided for the current switching operation, gives rise to a relatively large time requirement for the operation of a telecommunications exchange system of the known type referred to in the introduction for loading the subsidiary control units with the Program information and with the respective connection data, in particular for the latter.

It is an aim of the present invention to reduce the time requirement for the operation of a telecommunications exchange system of the type referred to in the introduction thus, following start-up or re-start-up, to permit an earlier commencement of the switching operation.

This time requirement is of particular significance in the case of temporary interruptions in operation in association with which it is necessary to re-transmit peripheral data from the central Processor to the subsidiary control units, which applies in particular to operating situations in which, during the current switching operation, remedial measures are required due to the occurrence of disturbances or the establishment of faults in the mode of functioning or in the peripheral data. Likewise in the case of deliberate changes in the mode of operation and/or the connection of the line trunk groups, and of the mode of operation of subscriber terminals and connection lines and of corresponding channels, it becomes necessary to transmit the respective peripheral data—generally even all the peripheral data or only the connection data—from the central processor to the subsidiary control units of the line trunk groups. Thus the aforementioned time requirement generally becomes disadvantageous, due to a delay of the start of the switching operation, whenever it is necessary to transmit connection data and possibly also program information from the respective central processor to the line trunk groups. The invention is intended to provide that as soon as possible following start-up, re-start-up (as a result of an interruption in operation) or following a similar measure, the switching operation to establish connections dialed by subscribers can be commenced.

SUMMARY OF THE INVENTION

According to this invention there is provided a centrally controlled telecommunications exchange system with a central section which comprises a central switching network and a central coordination processor, and with decentral line trunk groups which each comprise a subsidiary switching network, connected to the central switching network via connection paths which can be seized for the establishment of dialed connections, and a program-controlled subsidiary control unit which can be used to switch through-connections via said subsidiary switching network, the line trunk groups being connected via connection-individual and/or subscriber-individual terminating circuits to subscriber lines and-/or connection lines and to corresponding channels combined in transmission systems, a control channel extending from the coordination processor to the subsidiary control units, via which control channel the coordination processor, in association with the start of the switching operation of a respective line trunk group, transmits to said line trunk group, peripheral data items which are obtained from a central store assigned to this processor and which are stored semi-permanently by this line trunk group decentrally in an assigned store, and which consist in part of items of program information for its switching-orientated program control sequences and in part of items of connection data which are individually assigned to the terminating circuits and to the connected channels and which govern the switching and control operation in each individual case, including subscriber number, subscriber connection state, assignment data, operating state data, operating category data, subscriber type data, connection line type and channel type data, the transmission of the peripheral data to each of the line trunk groups being sub-divided into a first transmission procedure which is carried out prior to the start of its respective switching operation sequence on the one hand, and a second transmission procedure following the start of the switching operation sequence on the other hand, the first transmission procedure initially restricting the transmission of the peripheral data to that of the program information, and the second transmission procedure being sub-divided into a plurality of individual subsidiary transmission procedures which, during the already started operating sequence, are inserted into the data exchange, which is used for this purpose, between the central processor and the subsidiary control units in such manner that in the case of every incoming or outgoing seizure, which takes place for the first time following the respective start of the switching operation sequence, of in each case one of the terminating circuits or one of the corresponding connected channels, the respective line-individual channel-individual items of connection data, which in some cases are firstly requested by the respective subsidiary control unit, are transmitted from the central processor individually in respect of each terminator circuit and each corresponding channel, to the respective line trunk group and are stored in the store thereof.

The data transmission activities which must be performed by the central processor are distributed over a period of time. Only those items of connection data which are currently directly required for a connection establishment are ever transmitted from the central Processor to one of the line trunk groups and stored therein. If a subscriber call is made via a terminal or if a connected subscriber station is dialed or if a connection line or corresponding channel connected to a terminal is seized in the incoming or outgoing direction, all the items of connection data available for each terminal are transmitted, in particular in linked fashion, from the central processor to the respective line trunk group. In this way the items of connection data are repeatedly transmitted from the central processor to the line trunk groups and stored therein. After a long oPerating Period of, for example, half an hour or one hour, the remaining items of connection data which have not yet been transmitted from the central processor to the line trunk groups are then transmitted. This can also be delayed until the occurrence of an operating situation which is characterized by a particularly low traffic load of the central processor, e.g. at night.

BRIEF DESCRIPTION OF THE DRAWING

An embodiment of the invention will now be described by way of example, with reference to the accompanying drawing in which the sole FIGURE is a block circuit diagram of a portion of a telephone exchange system embodying this invention.

DESCRIPTION OF THE PREFERRED EMBODIMENT

The drawing of the present application is similar to FIG. 1A of U.S. Pat. No. 4,658,098, entitled "CIRCUIT ARRANGEMENT FOR TELECOMMUNICATIONS SWITCHING SYSTEMS, PARTICULARLY TELEPHONE SWITCHING SYSTEMS, COMPRISING INFORMATION-PROCESSING CENTRAL SWITCH DEVICES AND SUB-CENTRAL SWITCHING FACILITIES WHICH SUPPLY THE SAME WITH INFORMATION," which issued Apr. 14, 1987 to Wegmann, and which is assigned to the same assignee as the present patent. U.S. Pat. No. 4,658,098 is incorporated herein by reference. The elements illustrated in FIG. 1A of U.S. Pat. No. 4,658,098 which are the same as those illustrated in the sole FIGURE of the present patent are described in the above U.S. patent and are not described in detail below.

Only those components of the exchange system are shown in the drawing which are necessary for describing the construction and operation of the embodiment of this invention. The description will firstly discuss the general function sequences of the computer-controlled telephone exchange operating in accordance with the invention. Then specific features of the embodiment will be described.

Referring to the drawing, a switching network, which is constructed in three switching stages RZE, R and RZA, and thus is a central switching network, is provided at its input with a large number of switching network terminals, of which one, A, has been shown. The switching network consists of a plurality of switching network sections. Each of the switching network terminals always comprises a pair of t.d.m. lines, of which one t.d.m. line is used to transmit signals to the switching network and the other t.d.m. line to transmit signals from the switching network. Accordingly, the switching network terminal A comprises a t.d.m. line A1 and a t.d.m. line A2. For each of these two t.d.m. lines the respective signal transmission direction has been indicated by appropriate arrows.

The switching matrices of the first switching stage RZE are combined time-slot-space-slot-matrices, illustrated as hexagons. The switching matrices of the central switching stage R are space-slot matrices, illustrated as diamonds. The switching matrices of the last switching stage RZA are space-slot-time-slot-matrices, illustrated as hexagons. Each switching stage comprises a large number of the described matrices, although only three matrices of the described type have been shown in respect of each switching stage. The switching matrices of the different switching stages are connected to one another by intermediate lines in the manner illustrated in the drawing. These intermediate lines are t.d.m. intermediate lines. The switching network terminals are likewise of a t.d.m.-type. The central switching network can consist of a Plurality of components of the illustrated type which are connected to one another via t.d.m. lines (s1–s3) in the manner disclosed in German patent specification no. 15 37 849. Thus in this case these various parts together constitute the central switching network.

The switching network terminals, e.g. A, of the central switching network which consists, in the described fashion, of a plurality of switching network sections K, are connected via t.d.m. lines, in each case designed for both directions of communication transmission, for example t.d.m. line ltg1, to line trunk groups, for example the line trunk group LTG1. A line trunk group of this type is connected at its input end via connection-individual and/or subscriber-individual terminating circuits to subscriber lines (analogue and/or digital) to analogue connection lines and/or to PCM-connection lines which combine channels which can be seized individually in respect of each connection (alternatively or in combination). A subscriber station T1 connected to the line trunk group via a subscriber line. Each line trunk group contains coders, decoders, multiplexers, demultiplexers and the devices required to implement the so-called BORSCHT-function (see NTZ Vol. 33/1980, no. 10, pages 646 to 653 and 1978 International Zurich Seminar on Digital Communications, Proceedings IEEE Catalogue No. 78CH 1325-0 ASST, pages B2-1, A4.1, and also German patent application Nos. P 31 00 811.9; P 31 04 002.0 and P 31 06 903.7).

In each line trunk group terminating circuits designated as subscriber line circuits are respectively provided for the subscriber stations or are combined to form multiple subscriber line circuits LTU1-LTU8. The same applies to terminating circuits for connection lines and corresponding channels. The respective terminating circuits—in some cases combined several at a time in the described fashion—include stores LS for items of connection data which are stored in assignment to the individual subscriber- and connection line terminals (and to the correspondingly-connected channels). These are data items which determine the mode of operation of these terminal circuits. These data items govern the handling and flow of the switching operation in respect of the subscriber lines, connection lines and corresponding channels. They indicate, for example, the subscriber number and subscriber connection state assignment in respect of each subscriber station, operating state data (free, busy and the like), operating category data (concession of so-called facilities), subscriber type data (e.g. telephone subscriber, coin-operated device, telecopier and the like), connection line type data (signalling with d.c. signals, inductive dialing and the like), channel type data (carrier frequency, PCM and the like) and others. These items are thus connection data. They form part of the peripheral data and are stored decentrally semi-permanently in the line trunk groups, e.g. in the stores LS or in a store SP which is common to the respective line trunk group. They are stored at least centrally in a store AD assigned to the central control unit CP (see DE-OS No. 28 28 841) from where, as a result of the start-up or re-start-up following an interruption in operation (e.g. as a result of a fault) of the telephone exchange system they are transmitted to the respective line trunk groups and stored therein.

The peripheral data also include items of program information which are likewise stored centrally in a store PD of the central control unit CP from where they are transmitted, as a result of start-up or re-start-up, to the line trunk groups and are stored decentrally therein in semi-permanent fashion in a store, e.g. PU, which is common to each line trunk group. These items of program information are used in the line trunk group by its decentral control unit for the program-controlled handling of the switching orientated Processing and control procedures. These items of program information can be identical either in whole or in part from line trunk group to line trunk group. Therefore they can also be transmitted simultaneously from the central control unit CP to all the line trunk groups. They can also be input in part into the line trunk groups at the time of production.

A line trunk group also comprises a subsidiary switching network TSU and a setting device SESC which serves to control said subsidiary switching network by means of a subsidiary control unit, e.g. GP1. A subsidiary switching network (e.g. TSU) is thus the switching network of a line trunk group; on the other hand the switching network section K is a part of the central switching network which is composed in the described manner from a plurality of such switching network sections.

The construction and mode of operation of the line trunk group LTG1 are described in detail in German patent specification DE-OS No. 28 26 113 from the bottom of page 6. Reference is also made to the description of the telephone exchange system EWSD in the Supplement to the fourth edition (1981) of the magazine "Telcom Report" and reference is made to U.S. Pat. No. 4,564,725. The following description will assume, in particular, these details to be known per se and will be limited to the associations which are of particular importance in the present example.

A central coordination processor, referred to as central control unit CP, serves for example to establish the communications connections which are to be established via the central switching network. It determines the items of switching data required to establish each connection. The items of switching data for a connection which is to be switched through precisely indicate, as is known, the course of the respective connection via the switching network, thus the switching matrices are intermediate lines along which the connection extends, and the channels seized therein.

These items of switching data are prepared by means of the central control unit, one of the functions of which is thus as path finding device and availability store, and are transmitted to the switching network setting device KE of the switching network. The data flow, which transmits the items of switching data, from the central control unit CP to the switching network setting device KE extends via a buffer device, e.g. MB2, which is connected to the central control unit and which serves to intermediately store and recode data and to match the transmission speed. The buffer device can be limited to a part of these functions or to only one of these functions. Such a buffer device is described in detail, for example, in German patent specification DE-PS No. 15 37 849.

In addition to the coordination processor CP, a large number of decentral control deices GP1 to GPn have been shown which are also each referred to as subsidiary control units and which are respectively assigned to the line trunk groups LTG1 to LTGn. These control devices serve to carry out all the switching procedures within each of the line trunk groups. These switching procedures include in particular all the exchange procedures within these line trunk groups. Further details may be gathered from German patent specification DE-OS No. 28 26 113.

The decentral control devices GP1 to GPn are connected to the central control unit CP via control channels which are switched through individually in respect of each decentral control device via the switching network K to a buffer device, e.g. MB2. Thus an individual control channel leads from this buffer device to each of the decentral control devices. For this purpose the buffer device is connected via a t.d.m. line m to one of the switching network terminals. The buffer device is connected to one of the switching network terminals of the switcing network in the same way as each of the line trunk groups LTG1 to LTGn. The t.d.m. line m is thus connected to a switching network terminal which comprises a t.d.m. input to a space slot-time slot matrix of the first switching stage and a t.d.m. output from a space slot-time slot matrix of the last switching stage. Thus the t.d.m. line m is connected to a switching network terminal such as that referenced A. It includes a plurality of control channels.

The buffer device is used by all these control channels, and thus is commonly provided for said control channels. The control channels which lead to a respective buffer device, e.g. MB2, are connected via the section K shown in the drawing of the central switching network (consisting of a plurality of such sections), to the line trunk groups, e.g. LTG1 to LTGn which are connected to this section. The buffer devices MB1 and MB8 are assigned where appropriate to further such sections.

Each connection between a buffer device and the subsidiary control units of each of the line trunk groups, for example the line trunk group LTG1, extends via a control channel for the transmission of control signals from the buffer device to the respective line trunk group and for the transmission of information in the reverse direction. Each control channel consists—to be precise—in known manner of a pair of transmission channels, of which one is provided for one of the two predetermined transmission directions and a second for the other transmission direction.

Thus the embodiment which is shown in the drawing comprises a centrally controlled telecommunications exchange system in the form of a PCM telephone exchange system, with a central section which comprises a central switching network and a central coordination processor. In addition the central switching network is connected to decentral line trunk groups via connection paths, e.g. lines, channels or the like, which can be seized for the establishment of dialed connections. These connection paths lead in the respective line trunk group to a subsidiary switching network assigned thereto. Connections are switched through via this subsidiary switching network by means of a subsidiary control unit in the respective line trunk group.

The line trunk group is connected to subscriber lines and connection lines and to corresponding channels combined in transmission systems, e.g. PCM-30 systems.

From the subsidiary control unit of each line trunk group a control channel extends via the assigned subsidiary switching network, via one of the connection paths, and via the central switching network, where said control channel is switched through at the start of operation and is continuously maintained in the switched-through state during operation, and via which, for the exchange of information and control signals for the current switching operation, the subsidiary control unit has access to the coordination processor, and the latter at all times has access to the subsidiary control unit. For the switch-through of the subsidiary control unit via the subsidiary switching network, prior to the start-up of the subsidiary control unit, specific data items can be stored therein which, at the time of start-up, serve to switch-through the control channel from the subsidiary control unit via the respective subsidiary switching network, which control channel continues via the switching network K to the buffer device MB and enables data exchange with the coordination processor in the described fashion.

The switch-through and maintenance of the described control channels, which are referred to as semipermanent connections, via the central switching network K take place by means of the switching network setting device KE in the same manner as the establishment and maintenance of communications connections, for example telephone connections. For this purpose, in a manner known per se, the switching matrices of the switching network K are assigned holding stores which store the items of switching data relating to a switching matrix. These holding stores ensure that the requisite switch-through procedures are available in the respective time slots and that the requisite write procedures and read procedures take place for the full stores of the time slot matrices. All further details relating to the construction and mode of operation of a t.d.m. switching arrangement will be assumed to be known per se and therefore will not be discussed in further detail.

As mentioned above, in German patent specification DE-OS No. 28 26 113 it is disclosed that the subsidiary switching network TSU of the line trunk group LTG1 serves not only to establish communications connections from and to subscriber stations and connection lines but also to establish the connections for the control channels between the decentral control device, e.g. GP1, assigned to the line trunk groups, e.g. LTG1, on the one hand, and the central control unit CP on the other hand. These connections continue via the central switching network K and the t.d.m. line m.

In addition to the central switching network K, each of the line trunk groups LTG1 to LTGn is connected via a PCM line, for example ltg1, to one of the switching network terminals, for example A, of the switching network K in the described manner. This PCM-line in respect of each line trunk group leads within the line trunk group to a switch-through device in the form of the subsidiary switching network TSU via which both the control channels and the connections from and to subscribers and from and to connection lines are switched through. "Connection lines" are naturally also to be understood as channels of connected PCM connection lines. The connection of the subscriber lines, connection lines and channels can be understood from the publications referred to above.

From the subscriber lines, connection lines and channels connected to a line trunk group at its input end, different types of information arrive, for example call signals from subscriber stations which wish to establish a connection, dialed characteristics from these subscriber stations but also via connection lines and channels, and likewise line signals via connection lines and in assignment to channels. Subscriber line circuits for the connection of subscriber lines, terminating circuits for the connection of local and trunk connection lines which can be seized in the incoming and/or outgoing directions, internal connection sets, dialing receiving sets and the like are subscriber-individual and/or connection-individual switching devices. The subsidiary control unit now serves, in a manner known per se, to handle the reception of the connection-individual information items arriving via the switching devices. The subsidiary control unit also carries out the processing or pre-processing of these received information items in each case in assignment to the respective subscriber line, connection line or respective channel. In addition, some such items of information are intermediately stored in the store SP, which is individually assigned to the subsidiary control unit, and this with the assistance of an input-output device IOP. A further function of the subsidiary control unit is to transmit signals and control signals via these lines (subscriber lines and connection lines and channels), for example ringing a.c. pulses and call progress signals via subscriber lines, and dialed characteristics and line signals and the like via connection lines seized in the outgoing direction.

Via the subsidiary switching network assigned to each line trunk group, connections are switched through, in respect of the connection establishment direction, both in the incoming direction from a line (subscriber line, connection line or a corresponding channel) to the central switching network K and in the outgoing direction from said central switching network to such a line.

For a connection establishment, firstly, for example, a switch-through takes place from a subscriber line via the subsidiary switching network of the respective line trunk group to the central switching network K. The information items, e.g. items of dialed information, required for the further switch-through of the respective connection via this switching network are transmitted from the group control unit, via the respective control channel, to the central coordination processor CP. In the reverse direction the central coordination processor transmits control signals to each of the subsidiary control units. An input-output processor G cooperates in this procedure, the construction and mode of functioning of which are described in detail in German patent specification DE-OS No. 31 28 365, corresponding to U.S. Pat. No. 4,499,461, entitled "CIRCUIT ARRANGEMENT FOR CENTRALLY-CONTROLLED TELECOMMUNICATION EXCHANGE SYSTEMS, PARTICULARLY FOR TIME-DIVISION MULTIPLEX TELEPHONE EXCHANGE SYSTEMS, WITH INFORMATION EXCHANGE BETWEEN PBX DEVICES", which issued Feb. 12, 1985 to Schneider, incorporated by reference herein.

Each subsidiary control unit has access to the coordination Processor, which latter has access at all times to each of the subsidiary control units. For this purpose the central coordination processor can interrogate all the subsidiary control units consecutively, in a cyclic sequence, about the existence of information. This forwarding of information can also take place in another known fashion. Thus in general terms the central coordination processor receives information and emits control signals. The transmission of information items and control signals via the control channel of each of the line trunk groups takes place in manner known per se.

For the current switching operation these information items and control signals are transmitted in portions of limited size, thus in a suitable predetermined data format which is optimally adapted to the conditions of the current switching operation. Here an appropriate safeguarding transmission procedure is essential. Further details in this respect can be gathered from the European patent specification No. 0 058 750 and from the German OS No. 3 128 365. This relates in particular to the construction and mode of operation of the input-output processor G which is shown in the drawing and which handles the transmission of the information items and control signals from and to the line trunk groups. The call handling facility of the control channels, individually assigned to the line trunk groups is adapted to the magnitude of the flow of information items and control signals in the current switching operation.

As described above, each subsidiary control unit which is in operation stores data items required for the handling of the switching operation. These data items include, for example, items of program information which represent a basic item of information which each subsidiary control unit must possess in order that it can be started-up for the switching operation, i.e. for the execution of the connection establishment procedures. The program information required for a subsidiary control unit for the handling of the overall switching operation is thus necessary for the handling of the current switching operation.

Expediently all the program information required for the subsidiary control unit for the handling of the switching operation is input into the subsidiary control unit at the time of its start-up. In the same way the above-mentioned items of connection data which are likewise required for the handling of the switching operation and which indicate the connection of the line trunk group to subscriber and/or connection lines are stored in a subsidiary control unit only when it is started-up. These items of program information which are to be stored in each of the subsidiary control units, together with the items of connection data which are likewise to be stored, are transmitted from the central coordination processor to a subsidiary control unit when it commences operation.

To prevent the transmission of all the program information and the connection data to the line trunk groups using up too much time from the start-up or re-start-up until the commencement of the switching operation, it is provided, in accordance with the present invention, that the transmission of the peripheral data to each of the line trunk groups is sub-divided into a first transmission procedure, which is carried out prior to the start of its switching operation, on the one hand and a second transmission procedure following the start of the switching operation on the other hand.

The first transmission procedure firstly restricts the transmission of the peripheral data to that of the program information. Following the start-up or re-start-up, the coordination processor thus initially transmits only the program information, provided this is not already stored in the line trunk groups. The second transmission procedure is sub-divided into a plurality of individual subsidiary transmission procedures. These include all the items of connection data which are to be transmitted to the line trunk groups. Thus the start-up can also relate to only one single line trunk group. Preferably, however, the invention is of significance to operating situations in which the start-up or re-start-up relates to the entire telephone exchange system, thus all the line trunk groups.

The plurality of individual subsidiary transmission procedures in the second transmission procedure thus relates to the items of connection data. During the already started operating sequence these transmission subsidiary procedures are interposed into the data exchange, which is used for this operating sequence, between coordination processor and subsidiary control units in such manner that in the case of every incoming or outgoing seizure, which takes place for the first time following the respective start of the switching operation sequence, of one of the terminating circuits or one of the corresponding connected channels, the respective items of connection data are called-up individually by the coordination processor from the connection data store AD assigned thereto and are transmitted to the respective line trunk group and stored in the store thereof.

Thus the switching operation sequence is started immediately following the transmission of items of program information which are assigned to the peripheral data and which are called up from a program store PD, assigned to the coordination processor, and transmitted to all the line trunk groups (broadcasting). Whenever a connection establishment relates to a terminal of a line trunk group, firstly the items of connection data required for the respective terminal are transmitted from the coordination processor CP to the respective line trunk group and stored therein by the respective subsidiary control unit in the described fashion in respect of each terminal.

The seizure of a terminal can consist of a subscriber call, the seizure of a dialed subscriber terminal, an incoming seizure of a connection line, an outgoing seizure of a connection line or corresponding seizures of channels. In this context it is possible that the line-individual and channel-individual items of connection data may be requested firstly by the respective subsidiary control unit. A corresponding request is thus issued to the coordination processor which, on the occasion of a new connection establishment, firstly transmits the requested items of connection data to the subsidiary control unit of the respective line trunk group. These items of connection data are stored in the manner described earlier, from where they are available for all further connection establishment procedures and corresponding switching operation sequences (for example charge metering, connection clearance and the like).

The sub-division of the second transmission procedure into a plurality of individual subsidiary transmission procedures, which, in the described fashion, following a start-up or re-start-up, are firstly carried out in association with the respective connection establishment and the respective data exchange which takes place for said connection establishment, does in fact slightly lengthen the switching operation sequence, i.e. all the consecutively implemented connection establishment procedures; in addition the traffic load of the coordination processor and of the subsidiary control units is slightly increased temporarily in that the processing procedures, associated with the switching procedures, in the coordination processor and in the subsidiary control units, together with the transmission procedures between the latter are supplemented by the subsidiary transmission procedures. At the same time, however, it is provided that following a start-up or re-start-up of the described telephone exchange system the actual start of the switching operation sequence can take place substantially earlier than in known telephone exchange systems of an otherwise similar type. Following the start-up or re-start-up it is merely necessary to transmit the program information to the line trunk groups. The switching operation can then immediately commence. Following a starting phase of e.g. half an hour or one hour, it can then be provided that the coordination processor transmits all the still-missing items of connection data to the line trunk groups in which these items of connection data are stored in the described fashion. This can be delayed to items of lower traffic load, for example at the end of the main traffic period or during the night.

The time saving achieved by means of the mode of operation of this embodiment and the corresponding individual measures is particularly advantageous in operating situations in which short interruptions in operation occur which necessitate the re-transmission of peripheral data from the central processor to the subsidiary control units, which applies in particular to operating situations in which, during the current switching operation, remedial measures are required due to the occurrence of disturbances or the establishment of faults in the mode of functioning or in the peripheral data. Also in the case of deliberate changes to the mode of operation and/or the connection of the line trunk groups, and the mode of operation of subscriber terminals and connection lines and corresponding channels, it is likewise necessary to transmit the respective peripheral data—as a rule even all the peripheral data or only the connection data—from the central processor to the subsidiary control units of the line trunk groups. The time saving thus results in general from the avoidance of a delay of the start of the switching operation in all those operating situations in which it is necessary to transmit the connection data, and possibly also the program information, from the respective central processor to the line trunk groups. The embodiment described here provides that as soon as possible following start-up, re-start-up (due to the occurrence of an interruption in operation) or following a similar measure, the switching operation for the establishment of connections dialed by subscribers can commence.

Reference should also be made to the fundamental additional Possibility that subscriber stations, as described in German OS No. 36 34 863 can be connected to concentrators which are themselves connected via PCM-lines to line trunk groups of the type described above.

What is claimed is:

1. A centrally controlled telecommunications exchange system comprising:
   a central section including a central switching network and a central coordination processor;
   decentral line trunk groups each including a subsidiary switching network, connected to the central switching network via connection paths for establishing dialed connections, and a program-controlled subsidiary control unit for switching-through connections via said subsidiary switching network, the line trunk groups being connected via connection-individual and/or subscriber-individual terminating circuits to respective connection and/or subscriber lines and to corresponding channels in transmission systems; and
   a control channel extending from the central coordination processor to the subsidiary control units; wherein
   the central coordination processor, in association with the start of the switching operation of a respective line trunk group, transmits to said line trunk group, peripheral data items which are obtained from a central store assigned to the central coordination processor and which are stored semi-permanently by this line trunk group decentrally in an assigned store, and which consist in part of items of program information for its switching-orientated program control sequences and in part of items of connection data which are individually assigned to the terminating circuits and to the connected channels and which govern the switching and control operation in each individual case, including subscriber number, subscriber connection state, assignment data, operating state data, operating category data, subscriber type date, connection line type and channel type data, the transmission of the peripheral data to each of the line trunk groups comprising a first transmission procedure which is carried out prior to the start of its respective switching operation sequence on the one hand, and a second transmission procedure following the start of the switching operation sequence on the other hand, the first transmission procedure transmitting only the items of program information, and the second transmission procedure including a plurality of individual subsidiary transmission procedures which, during the already started operating sequence, are inserted into a data exchange, which is used for this purpose, between the central coordination processor and the subsidiary control units in such manner that, in the case off every incoming or outgoing seizure which takes place for the first time following the respective state to the switching operation sequence, of in each case one of the connection-individual and/or subscriber-individual terminating circuits or one of the corresponding connected channels, the respective line-individual channel-individual items of connection data, which in some cases are firstly requested by the respective subsidiary control unit, are transmitted from the central coordination processor individually in respect of each one of the connection-individual and/or subscriber-individual terminator circuits and each corresponding channel, to the respective line trunk group and are stored in the store thereof.

2. An exchange system as claimed in claim 1, wherein the first transmission procedure takes place simultaneously for some or all of the line trunk groups, whereas the second transmission procedure takes place individually in respect of each line trunk group.

3. An exchange system as claimed in claim 1, wherein some of the items of program information which are stored in the stores of the line trunk groups are stored permanently, e.g. at the time of production.

4. An exchange system according to any one of the preceding claims, wherein respective control channels extend from said coordination processor to the subsidiary control units.

5. An exchange system according to any one of claims 1 to 3, wherein said exchange system is a PCM telephone exchange system.

* * * * *